United States Patent [19]

Mimura

[11] Patent Number: 5,072,165
[45] Date of Patent: Dec. 10, 1991

[54] TEMPERATURE DETECTING DEVICE FOR A VEHICULAR ELECTROMAGNETIC CLUTCH

[75] Inventor: Munehiko Mimura, Himeji City, Japan

[73] Assignee: Mitsubishi Denki K.K., Tokyo, Japan

[21] Appl. No.: 542,558

[22] Filed: Jun. 25, 1990

[30] Foreign Application Priority Data

Jun. 27, 1989 [JP] Japan .................................. 1-164729

[51] Int. Cl.$^5$ ............................................ G05D 23/00
[52] U.S. Cl. ...................................................... 318/558
[58] Field of Search ............... 318/471, 558; 388/923, 388/934; 340/453; 192/0.03, 0.032, 0.033, 0.034

[56] References Cited

FOREIGN PATENT DOCUMENTS 98822 of 1985 Japan .
57-342 of 1988 Japan .
2084280 of 1982 United Kingdom .
2129990 of 1984 United Kingdom .

*Primary Examiner*—Bentsu Ro
*Attorney, Agent, or Firm*—Sughrue, Mion, Zinn, Macpeak & Seas

[57] ABSTRACT

A novel and improved temperature detecting device for detecting the temperature of a vehicular clutch is disclosed which is able to provide an accurate voltage across the electromagnetic clutch by taking account of a voltage drop across power supply elements inside the clutch and a voltage drop in wiring due to a current flowing through the clutch, improve the accuracy in detection of the clutch temperature, and have high reliability and commerciality for vehicular use. To this end, a clutch voltage sensing element senses a voltage across an electromagnetic clutch. A clutch current calculating element generates a clutch current command signal, which controls the current supply to the electromagnetic clutch, and a clutch cut-off signal based on engine control information data and travel control information data of a vehicle. The clutch current calculating element calculates the electric resistance of the electromagnetic clutch based on the clutch voltage sensed by the clutch voltage sensing element and on the clutch current command signal so as to determine the actual temperature of the electromagnetic clutch. A clutch current controller controls the current supply to the electromagnetic clutch based on a deviation between the clutch current command signal and a current feedback signal representative of a clutch current flowing through the electromagnetic clutch, and on the clutch cut-off signal.

4 Claims, 4 Drawing Sheets

TEMPERATURE DETECTING DEVICE FOR A VEHICULAR ELECTROMAGNETIC CLUTCH

BACKGROUND OF THE INVENTION

The present invention relates to a device for detecting the temperature of an electromagnetic clutch for vehicular use. More particularly, it relates to a temperature detecting device which can precisely detect the temperature of an electromagnetic clutch mounted on a vehicle, by calculating a change in the electric resistance of the clutch based on the clutch current and the clutch voltage.

An example of a conventional clutch controller, as illustrated in FIG. 3, which can be utilized for detecting the clutch temperature, is described in Japanese Patent Laid-Open No. 63-57342. In FIG. 3, the clutch controller illustrated includes a clutch current control means 1, a clutch current calculating means 2 such as a microcomputer, a power source 3 in the form of a battery mounted on a vehicle, and a vehicular electromagnetic clutch 4.

The clutch current calculating means 2 receives a travel control information signal SD and an engine control information signal SE, and generates, based on these signals SD and SE, a clutch current command signal SI which is inputted to a positive input terminal of a deviation amplifier 14 of the clutch current control means 1, and a clutch cut-off signal SO which is supplied to the base of an NPN transistor 12, which functions as an output transistor, inside the clutch current control means 1. The NPN transistor 12 has the emitter thereof connected to the negative terminal of the battery 3 and to ground through a clutch current sensing resistor 13. The emitter of the NPN transistor 12 is also coupled with the negative input terminal of the deviation amplifier 14 so as to input a current feedback signal SF. The deviation amplifier 14 generates a deviation between the clutch current command signal SI and the current feedback signal SF and outputs a signal indicative of the result of calculation via a pulse width modulator (PWM) 15 to the base of a PNP transistor 11, which functions as an output transistor, for turning it on and off. The PNP transistor 11 has the emitter connected with the positive terminal of the battery 3, and the collector connected to ground via a parallel circuit comprising a circulation diode 16 and a deexcitation resistor 18, and at the same time to an output terminal 20 of the clutch current control means 1.

The NPN transistor 12 has the collector connected with the positive terminal of the battery 3 through a parallel circuit comprising a deexcitation resistor 19 and an overcurrent suppression diode 17, and at the same time with an output terminal 21 of the clutch current control means 1.

The deexcitation resistors 18, 19 function to supply a slight amount of deexcitation current to the electromagnetic clutch 4 when both the PNP and NPN transistors 11, 12 are off.

The output terminals 20, 21 of the clutch current control means 1 are connected with power supply elements 42a, 42b for the electromagnetic clutch 4. The clutch 4 comprises an excitation coil 41 and the power supply elements 42a, 42b connected in series thereto.

In operation, the clutch current calculating means 2 calculates the speed of the vehicle, the number of revolutions per minute of the engine, and a clutch torque based on the travel control information signal SD and the engine control information signal SE. The clutch current calculating means 2 then generates an output signal of a wave form (i.e., in the form of a clutch current) corresponding to the clutch torque thus calculated.

When the electromagnetic clutch 4 is cut off or disengaged, the PNP transistor 11 and the NPN transistor 12 are turned off by the output signal of the pulse width modulator 15 and the clutch cut-off signal SO from the clutch current calculating means 2, respectively, so that a slight or limited deexcitation current is caused to flow through the electromagnetic clutch 4 via the deexcitation resistor 18, 19 in the reverse direction. On the other hand, when the electromagnetic clutch 4 is engaged, the NPN transistor 12 remains on so that the clutch current flowing through the electromagnetic clutch 4 is sensed by the clutch current sensing resistor 13 as a clutch voltage. The clutch voltage across the clutch current sensing resistor 13 is imposed on the negative input terminal of the deviation amplifier 14, as a current feedback signal SF, which receives, at its positive input terminal, the clutch current command signal SI from the clutch current calculating means 2. The deviation amplifier 14 compares the clutch current command signal SI and the current feedback signal SF and generates an output signal indicative of a deviation therebetween, which is outputted to the pulse width modulator 15. The pulse width modulator 15 modulates the pulse width of the output of the deviation amplifier 14 and sends an output signal to the base of the PNP transistor 11 whereby the transistor 11 is turned on and off depending on the pulse width of the pulse width modulator output, so as to control the current supply to the electromagnetic clutch 4. When the PNP transistor 11 is off, a circulating current flows through the circulation diode 16.

FIG. 4 shows another example of a conventional clutch controller having a clutch temperature detecting function which is disclosed in Japanese Patent Laid-Open No. 60-98822. The clutch controller illustrated in FIG. 4 is substantially similar to that of FIG. 3 except for a clutch voltage sensing circuit. Thus, the same or corresponding elements are identified by the same reference numerals. The clutch controller of FIG. 4 includes a deviation amplifier 14 and a pulse width modulator 15 which are more concrete in arrangement than, but substantially similar in operation to, those of the previously described example of FIG. 3. Specifically, in FIG. 4, a clutch current command signal SI generated by a clutch current calculating means (not shown) is inputted to the positive input terminal of the deviation amplifier 14 via a resistor 14a. The positive input terminal of the deviation amplifier 14 is connected to the positive terminal of a battery 3 through a pair of serial resistors 14b, 14c. The deviation amplifier 14 has the output terminal coupled via a resistor 15a with the base of a transistor 15b, which is a major component of the pulse width modulator 15, and at the same time with a junction between the resistors 14b, 14c. The transistor 15b has the emitter grounded and the collector coupled with the base of a PNP transistor 11 through a resistor 15c. The base of the PNP transistor 11 is coupled with the emitter thereof via a resistor 11a. The transistor 15b and the resistors 15a, 15c together constitute the pulse width modulator 15.

The PNP and NPN transistors 11, 12 and the circuit around the electromagnetic clutch 4 are illustrated in a much simpler form than those of FIG. 3, but they have substantially the same arrangement and operation. The NPN transistor 12 receives at its base a clutch cut-off signal SO through a resistor 12a.

A voltage sensing circuit 50 comprises a series circuit including a filter 24 and a Zener diode 23 connected between the collector of the PNP transistor 11 and ground. The filter 24 comprises a resistor 24a and a capacitor 24b connected in series with each other with a junction therebetween being connected with the positive input terminal of the comparator 50a which receives, at its negative input terminal, a clutch current command signal SI from the clutch current calculating means 2. The comparator 50a has an output terminal connected with the positive terminal of the battery 3 through a resistor 50b, and at the same time with an output terminal 50c of the voltage sensing circuit 50 for outputting a clutch voltage signal SC2.

Now, explanation will be made of how to detect the temperature of the electromagnetic clutch 4 while referring to FIG. 4. Of course, detection of the clutch temperature is carried out when the electromagnetic clutch 4 is in an engaged state. In this state, current is supplied from the battery 3 to the electromagnetic clutch 4 when the PNP transistor 11 is turned on. The PNP transistor 11 is held on as long as the pulse width of an output pulse of the pulse width modulator 15. As a result, a voltage drop across the electromagnetic clutch 4 is developed due to the pulse-width-modulated exciting current flowing through the excitation coil 41 and it is imposed upon the filter 24. The filter 24 detects an estimated voltage across the excitation coil 41 from the voltage drop across the clutch 4.

Since the voltage drops across the power supply elements 42a, 42b are substantially constant irrespective of the temperature of the electromagnetic clutch 4 and the magnitude of current therethrough, the clutch voltage inputted to the positive input terminal of the comparator 50a is directly affected by the voltage drops across the NPN transistor 12 and the clutch current sensing resistor 13 in the forward direction. Therefore, the forward direction voltage drop across the constant voltage diode 23 is set to be offset by the voltage drops across the power supply elements 42a, 42b, the voltage drop across the NPN transistor 12 and the voltage drop across the clutch current sensing resistor 13 so that an error voltage or a voltage difference between the estimated voltage and the desired average voltage across the exciting coil 41, which is the sum of the voltages across the power supply elements 42a, 42b, the voltage across the NPN transistor 12 and the voltage across the resistor 13, can be eliminated. That is to say, the comparator 50a makes a comparison between the actual voltage drop across the electromagnetic clutch 4, which is imposed on the positive input terminal thereof through the filter 24, and the voltage of the clutch current command signal SI, which is fed from the clutch current calculating means 2, and generates an output signal SC2 when the actual clutch voltage is greater than that of the clutch current command signal SI. Thus, temperature detection of the electromagnetic clutch 4 is effected by detecting a change (i.e., an increase or decrease) in the electric resistance of the clutch 4, which has a certain relationship with the clutch temperature.

With the conventional clutch controller as constructed above, however, the voltage drop between the collector of the PNP transistor 11 and the negative terminal of the battery 3 is fed to the filter 24 where the total sum of the voltage drops across the power supply elements 42a, 42b and the voltage drops across the transistor 12 and the clutch current sensing resistor 13 is offset by the voltage drop across the constant voltage diode 23 so as to provide the clutch voltage across the exciting coil 41. However, since the voltage drops across the NPN transistor 12 and the resistor 13 vary depending on the temperature thereof and the magnitude of current therethrough, it is difficult to control the voltage drop across the diode 23 in such a manner as to exactly match the above total sum of the voltage drops, resulting in poor temperature detection. Thus, if the clutch temperature detected is incorrect, i.e., if the detected clutch temperature is above a prescribed level though the actual clutch temperature is not so high, the current supply to the electromagnetic clutch 4 is interrupted to needlessly disconnect the clutch 4. On the other hand, if the detected clutch temperature is incorrectly below a prescribed level, the electromagnetic clutch 4 may be continuously held connected, resulting in possible overheating.

SUMMARY OF THE INVENTION

Accordingly, the present invention is intended to obviate the above-described drawbacks of the conventional temperature detecting device.

It is an object of the present invention to provide a novel and improved clutch temperature detecting device for detecting the temperature of a vehicular electromagnetic clutch which is able to provide an accurate voltage across the electromagnetic clutch by taking account of a voltage drop across power supply elements inside the clutch and a voltage drop in wiring due to a current flowing through the clutch, improve the accuracy in detection of the clutch temperature, and have high reliability and commerciality for vehicular use.

To achieve the above object, the present invention provides a clutch temperature detecting device for detecting the temperature of a vehicular electromagnetic clutch, the device comprising:

clutch voltage sensing means for sensing a voltage across the electromagnetic clutch;

clutch current calculating means connected to receive engine control information data and travel control information data of a vehicle for generating a clutch current command signal, which controls the current supply to the electromagnetic clutch, and a clutch cut-off signal, the clutch current calculating means being operable to calculate the electric resistance of the electromagnetic clutch based on the clutch voltage sensed by the clutch voltage sensing means and on the clutch current command signal so as to determine the actual temperature of the electromagnetic clutch; and clutch current control means for controlling the current supply to the electromagnetic clutch based on a deviation between the clutch current command signal and a current feedback signal representative of a clutch current flowing through the electromagnetic clutch, and on the clutch cut-off signal.

Preferably, the electromagnetic clutch comprises an exciting coil and a pair of power supply elements connected in series with the exciting coil. The current calculating means calculates a voltage across the exciting coil while taking account of voltage drops across the power supply elements and wiring between the electromagnetic clutch and the clutch voltage sensing means.

Preferably, the clutch current control means has a pair of output terminals connected with the opposite ends of the electromagnetic clutch, and the clutch voltage sensing means comprises:

a filter connected to receive a voltage drop across the output terminals of the clutch current control means for smoothing the voltage drop in the form of an analog signal; and an analog to digital converter for converting the analog output signal of the filter into a digital signal which is fed back to the clutch current calculating means.

In an embodiment, the clutch current control means comprises:

a deviation amplifier connected to receive the clutch current command signal from the clutch current calculating means and the current feedback signal for generating an output signal in the form of a pulse indicative of a deviation therebetween;

a pulse width modulator for modulating the pulse width of the output signal of the deviation amplifier;

a PNP transistor having a base connected to receive the output signal of the pulse width modulator, an emitter coupled with a power source, and a collector coupled via one of the output terminals with one end of the electromagnetic clutch; and an NPN transistor having a base connected to receive the clutch cut-off signal from the clutch current control means, a collector coupled via the other output terminal with the other end of the electromagnetic clutch, and an emitter connected to ground via a clutch current sensing resistor and at the same time to the deviation amplifier for feeding back thereto the clutch current as the current feedback signal.

The above and other objects, features and advantages of the present invention will be more readily apparent from the following detailed description of a preferred embodiment of the invention taken in conjunction with the accompanying drawings.

DESCRIPTION OF THE PREFERRED EMBODIMENT

The present invention will now be described in detail with reference to a preferred embodiment thereof as illustrated in the accompanying drawings.

Figure 1:
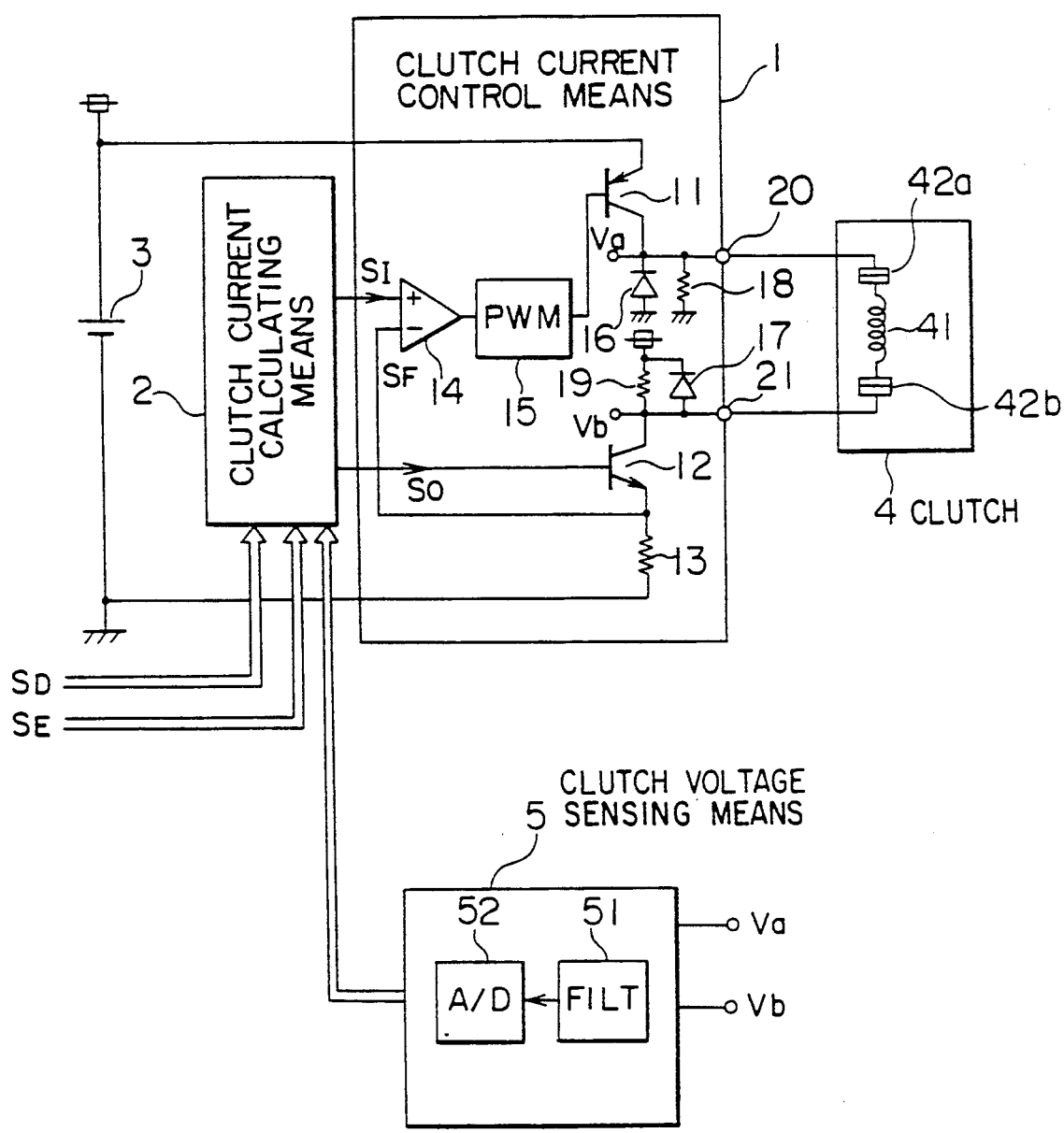
FIG. 1 is a block diagram of a clutch temperature detecting device for an electromagnetic clutch adapted to be mounted on a vehicle in accordance with the present invention.
Figure 3:
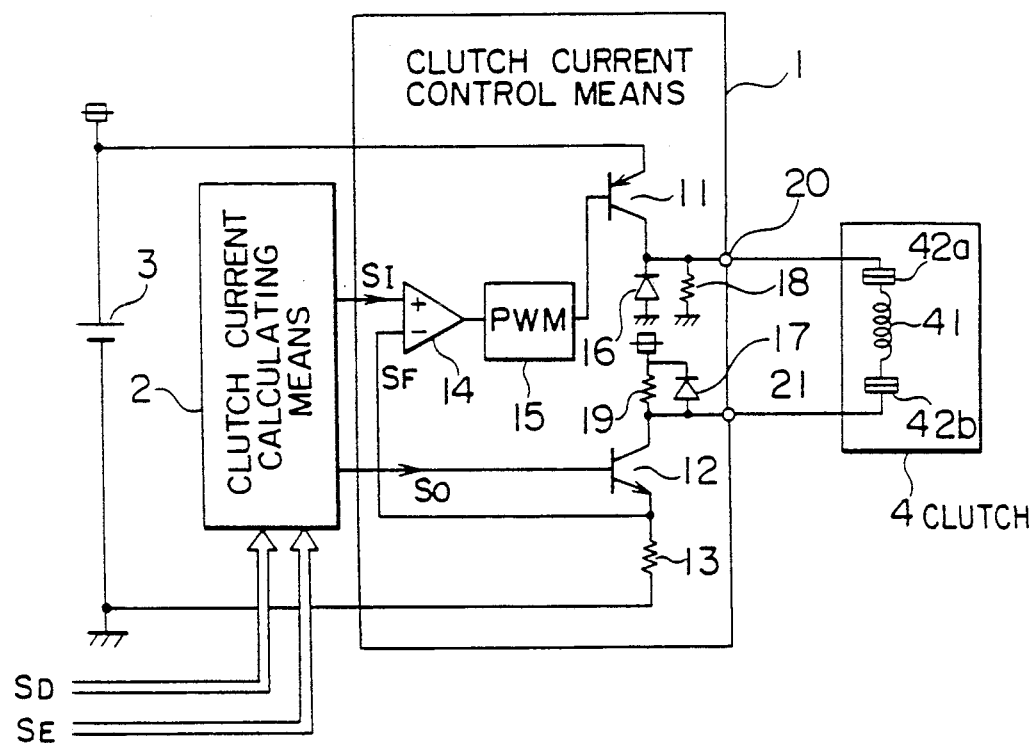
FIG. 3 is a block diagram of a conventional clutch controller for controlling a vehicular clutch.
Figure 4:
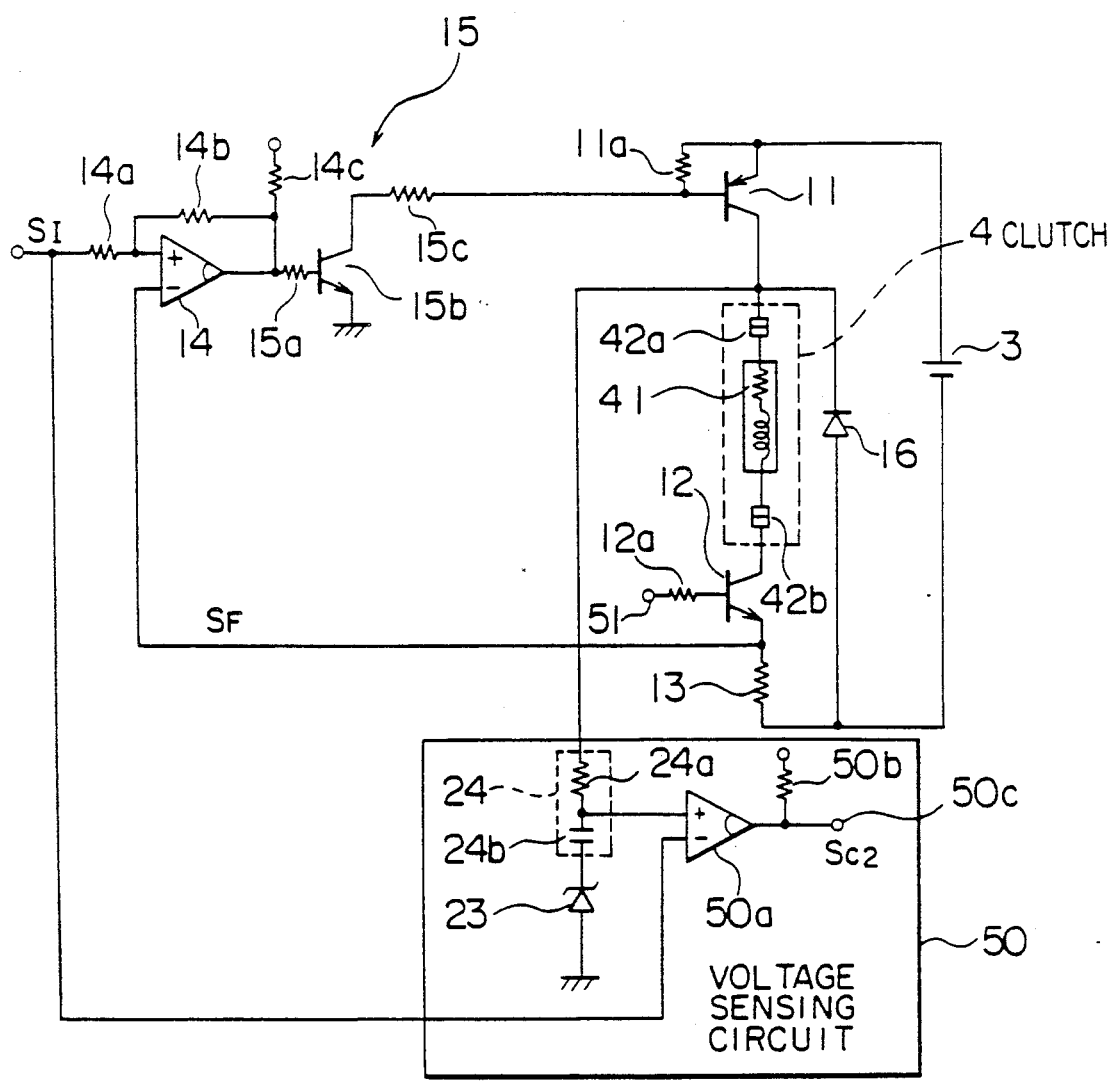
FIG. 4 is a circuit diagram of another conventional clutch controller showing a concrete circuit arrangement of major components such as a deviation amplifier, a pulse width modulator, etc., of a clutch current control means.

Referring to the drawings and first to FIG. 1, there is shown the circuit arrangement of a clutch temperature detecting device for a vehicular electromagnetic clutch constructed in accordance with the principles of the present invention. The clutch temperature detecting device includes, in addition to a clutch current control means 1, a clutch current calculating means 2, a power supply 3 in the form of a battery mounted on a vehicle and an electromagnetic clutch 4 all of which are the same as the components 1 through 4 of the conventional device of FIG. 3, a clutch voltage sensing means 5 for sensing the voltage across the electromagnetic clutch 4. The clutch voltage sensing means 5 is connected to receive voltages Va and Vb at output terminals 20, 21 of the clutch current control means 1, which are connected with the opposite ends of the electromagnetic clutch 4, so as to sense the voltage across the electromagnetic clutch 4. The clutch voltage sensing means 5 includes a filter 51 connected with the output terminals 20, 21 of the clutch current control means 1 for smoothing a voltage drop thereacross (i.e., a difference between the terminal voltages Va, Vb) in the form of an analog signal, and an analog to digital (A/D) converter 52 for converting the analog output signal of the filter 51 into a digital signal. The digitized output of the A/D converter 52 is fed back to the clutch current calculating means 2. The arrangement other than the above of this embodiment is substantially similar to the conventional device of FIG. 3. Thus, the same or corresponding elements of this embodiment are identified by the same symbols as employed in FIG. 3.

In operation, the clutch current calculating means 2 generates, based on engine control information data and travel control information data of the vehicle, a clutch cut-off signal SO and a clutch current command signal SI which is inputted to the positive input terminal of the deviation amplifier 14. A current feedback signal SF is fed back from the clutch current sensing resistor 13 to the negative input terminal of the deviation amplifier 14. The deviation amplifier 14 generates an output signal representative of a deviation between the clutch current command signal SI and the current feedback signal SF to the pulse width modulator 15.

The pulse width modulator 15 modulates the pulse width of the output signal of the deviation amplifier 14, and feeds the thus modulated signal to the base of the PNP transistor 11 so that the transistor 11 is turned on and off in dependence on the pulse width of the pulse width modulator output. When the PNP transistor 11 is turned on, it energizes the electromagnetic clutch 4.

On the other hand, the clutch cut-off signal SO is inputted to the base of the NPN transistor 12 so as to control the NPN transistor 12. When power is to be supplied to the electromagnetic clutch 4 for engagement thereof, the clutch cut-off signal SO turns on the NPN transistor 12, whereas when the power supply to the clutch 4 is to be cut off for the disengagement thereof, the clutch cut-off signal SO turns off the NPN transistor 12.

When both of the positive and NPN transistors 11, 12 are turned off, the electromagnetic clutch 4 is disengaged. In this state, in order to eliminate a slight transmission torque within the clutch 4 due to a residual magnetic force which remains therein after interruption of the power supply to the clutch 4, a counter current is supplied from the battery 3 to the electromagnetic clutch 4 through deexcitation diodes 18, 19 so as to energize the excitation coil 41 of the clutch 4 in the reverse direction.

On the other hand, when the PNP transistor 11 is turned off with the electromagnetic clutch 4 engaged, current is supplied from the battery 3 to the clutch 4 through a circulation diode 16.

An overvoltage suppression diode 17 serves to absorb a surging voltage to be fed to the NPN transistor 12, and also to quickly cut off the clutch current.

In the above manner, current is supplied from the battery 3 to the electromagnetic clutch 4 in accordance with the on-off operations of the positive and NPN transistors 11, 12, whereupon voltages Va, Vb develop at the output terminals 20, 21 of the clutch current control means 1 which are connected with the opposite ends of the electromagnetic clutch 4. The terminal voltages Va, Vb are inputted to the filter 51 of the clutch voltage sensing means 5 which functions to suppress voltage control ripples due to the pulse width modulation of the pulse width modulator 15. The filter 51 generates an output signal (i.e., a difference between the voltages Va, Vb) in the form of an analog signal which is then digitized by the A/D converter 52 and fed back to the clutch current calculating means 2.

Figure 2:
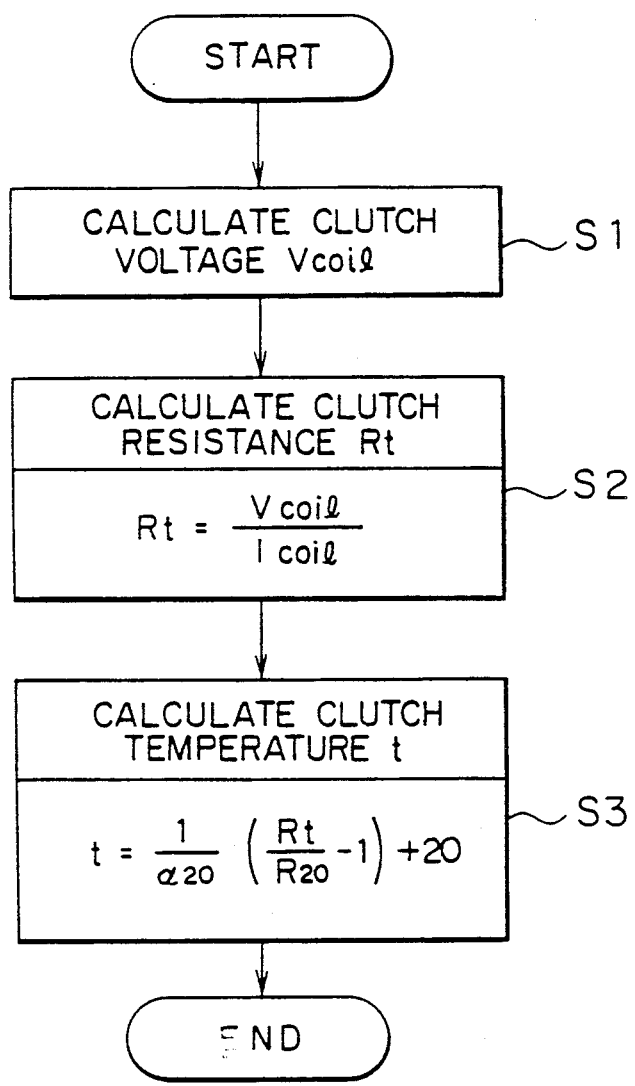
FIG. 2 is a flowchart showing the procedure of calculating the clutch temperature performed by a clutch current calculating means of FIG. 1.

Next, the temperature calculation processing of the clutch current calculating means 2 will be described while referring to the flowchart of FIG. 2. First in Step S1, a clutch voltage Vcoil across the exciting coil 41 of the electromagnetic clutch 4 is calculated from the terminal voltages Va, Vb which are A/D converted by the A/D converter 52 while taking account of a voltage drop Vp due to the power supply elements 42a, 42b inside the clutch 4 and a voltage drop Vw due to wiring between the clutch 4 and the clutch voltage sensing means 5. Thus, the following equation is established:

$$Vcoil = Va - Vb - Vp - Vw$$

Then, in Step S2, the electric resistance Rt of the exciting coil 41 is calculated from the clutch voltage Vcoil thus obtained and a clutch current value Icoil set by the clutch current command signal SI. Subsequently, in Step S3, the actual temperature t of the electromagnetic clutch 4 is calculated based on the thus obtained clutch resistance Rt, using the following formula:

$$t = 1/\alpha_{20}(Rt/R_{20} - 1) + 20$$

where $\alpha_{20}$ is a coefficient of temperature at 20° C., and $R_{20}$ is the clutch resistance at 20° C.

As apparent from the above description, the coil voltage Vcoil across the excitation coil 41 is able to be exactly determined because the voltage drop due to the power supply elements 42a, 42b is substantially constant irrespective of the clutch temperature and the magnitude of clutch current, and because the voltage drop due to wiring can also be exactly determined. Therefore, based on the exact coil voltage Vcoil, the temperature of the electromagnetic clutch 4 is able to be determined with a high degree of accuracy.

What is claimed is:

1. A clutch temperature detecting device for detecting the temperature of a vehicular electromagnetic clutch, the device comprising:
    clutch voltage sensing means for directly sensing a voltage across the electromagnetic clutch and outputting a clutch voltage signal;
    clutch current calculating means, connected to receive said clutch voltage signal, engine control information data and travel control information data of a vehicle, for calculating a clutch current and generating a clutch current command signal, which controls the current supply to the electromagnetic clutch, and a clutch cut-off signal, the clutch current calculating means being operable to calculate the electric resistance of the electromagnetic clutch based on the clutch voltage signal sensed by the clutch voltage sensing means and fed back to said clutch current calculating means, and on the clutch current command signal so as to determine the actual temperature of the electromagnetic clutch; and
    clutch current control means for controlling the current supply to the electromagnetic clutch based on a deviation between the clutch current command signal and a current feedback signal representative of a clutch current flowing through the electromagnetic clutch, and on the clutch cut-off signal.

2. A clutch temperature detecting device as claimed in claim 1, wherein the electromagnetic clutch comprises an exciting coil and a pair of power supply elements connected in series with the exciting coil.

3. A clutch temperature detecting device as claimed in claim 1, wherein the clutch current control means has a pair of output terminals connected with the opposite ends of the electromagnetic clutch, and the clutch voltage sensing means comprises:
    a filter connected to receive a voltage drop across the output terminals of the clutch current control means for smoothing the voltage drop, said voltage drop being in the form of an analog signal; and
    an analog-to-digital converter for converting the analog signal of the filter into a digital signal which is fed back to the clutch current calculating means.

4. A clutch temperature detecting device as claimed in claim 3, wherein the clutch current control means comprises:
    a deviation amplifier connected to receive the clutch current command signal from the clutch current calculating means and the current feedback signal for generating an output signal indicative of a deviation therebetween;
    a pulse width modulator responsive to said output signal for pulse width modulating the current to said electromagnetic clutch;
    a PNP transistor having a base connected to receive the output signal of the pulse width modulator, an emitter coupled with a power source, and a collector coupled via one output terminal of said clutch current control means with one end of the electromagnetic clutch; and
    an NPN transistor having a base connected to receive the clutch cut-off signal from the clutch current calculating means, a collector coupled via the other output terminal of said clutch current control means with the other end of the electromagnetic clutch, and an emitter connected to ground via a clutch current sensing resistor and at the same time to the deviation amplifier for feeding back thereto the clutch current as the current feedback signal.

* * * * *